United States Patent
Hadar et al.

(10) Patent No.: US 12,405,840 B2
(45) Date of Patent: Sep. 2, 2025

(54) ESTIMATING AND IMPROVING RESIDUAL CARBON DEBT IN CLOUD-BASED APPLICATIONS

(71) Applicant: Accenture Global Solutions Limited, Dublin (IE)

(72) Inventors: Eitan Hadar, Nesher (IL); Benny Rochwerger, Tel Aviv (IL)

(73) Assignee: Accenture Global Solutions Limited, Dublin (IE)

( * ) Notice: Subject to any disclaimer, the term of this patent is extended or adjusted under 35 U.S.C. 154(b) by 825 days.

(21) Appl. No.: 17/699,766

(22) Filed: Mar. 21, 2022

(65) Prior Publication Data
US 2022/0308939 A1    Sep. 29, 2022

Related U.S. Application Data

(60) Provisional application No. 63/166,163, filed on Mar. 25, 2021.

(51) Int. Cl.
   *G06F 9/50*    (2006.01)
(52) U.S. Cl.
   CPC .......... *G06F 9/5094* (2013.01); *G06F 9/5072* (2013.01)
(58) Field of Classification Search
   CPC .................. G06F 9/5094; G06F 9/5072
   See application file for complete search history.

(56) References Cited

U.S. PATENT DOCUMENTS

| | | | | |
|---|---|---|---|---|
| 8,683,479 B1* | 3/2014 | Arlitt | ............... | G06F 9/5088 |
| | | | | 709/224 |
| 9,075,408 B2* | 7/2015 | Loldj | ............... | G05B 19/042 |
| 9,547,353 B1* | 1/2017 | Marr | ............... | G06F 1/3206 |
| 2008/0255899 A1* | 10/2008 | McConnell | ......... | G06Q 10/10 |
| | | | | 705/7.11 |
| 2009/0201293 A1* | 8/2009 | Tung | ............... | G06Q 10/04 |
| | | | | 713/100 |

(Continued)

OTHER PUBLICATIONS

EP Extended Search Report in European Appln. No. 22164070.9, dated Aug. 26, 2022, 9 pages.

(Continued)

*Primary Examiner* — Benjamin C Wu
(74) *Attorney, Agent, or Firm* — POLSINELLI PC

(57) ABSTRACT

Methods, systems, and apparatus, including computer programs encoded on a computer storage medium, for reducing carbon emission debt. A method includes actions of obtaining candidate cloud deployment architectures; obtaining a set of requirements for quality attributes, each requirement corresponding to a respective quality attribute of the candidate cloud deployment architectures; selecting, from the candidate cloud deployment architectures, a particular cloud deployment architecture for implementation based on the set of requirements for the quality attributes; determining a wasted carbon emission debt for the particular cloud deployment architecture; selecting a requirement corresponding to a particular quality attribute to adjust based on the wasted carbon emission debt; and providing, for output, an adjusted requirement corresponding to the particular quality attribute. The wasted carbon emission debt includes a difference between the actual carbon emission debt and the theoretical carbon emission debt.

16 Claims, 13 Drawing Sheets

(56) References Cited

U.S. PATENT DOCUMENTS

| | | | | |
|---|---|---|---|---|
| 2009/0204916 | A1* | 8/2009 | Benedek | G06F 1/3203 715/764 |
| 2009/0281846 | A1* | 11/2009 | Rose | G06Q 10/06 705/7.39 |
| 2010/0191998 | A1* | 7/2010 | Moore | G06Q 10/06 713/340 |
| 2011/0016214 | A1* | 1/2011 | Jackson | G06F 9/505 718/101 |
| 2011/0082596 | A1* | 4/2011 | Meagher | H02J 13/00017 700/291 |
| 2011/0246987 | A1* | 10/2011 | Diwakar | G06F 9/5094 718/1 |
| 2012/0179824 | A1* | 7/2012 | Jackson | H04L 47/827 709/226 |
| 2013/0116803 | A1* | 5/2013 | Gmach | G05B 19/042 700/33 |
| 2015/0339159 | A1* | 11/2015 | Gupta | G06F 9/5094 718/105 |
| 2016/0019084 | A1* | 1/2016 | Forestiero | G06F 9/5094 718/1 |
| 2018/0052431 | A1* | 2/2018 | Shaikh | H02J 3/003 |
| 2021/0342185 | A1* | 11/2021 | Naidu | G06F 1/3206 |
| 2021/0373973 | A1* | 12/2021 | Ekins | G06F 9/5088 |
| 2022/0035680 | A1* | 2/2022 | Sharma | G06Q 10/06393 |
| 2022/0308939 | A1* | 9/2022 | Hadar | G06Q 30/02 |
| 2022/0344934 | A1* | 10/2022 | Jayan | H02J 3/004 |
| 2023/0017632 | A1* | 1/2023 | Herb | G06F 11/3006 |
| 2023/0049241 | A1* | 2/2023 | Davidson | G06Q 50/10 |
| 2024/0201675 | A1* | 6/2024 | Copperthite | G05B 19/41885 |
| 2025/0103908 | A1* | 3/2025 | Rizk | G06N 3/10 |
| 2025/0156781 | A1* | 5/2025 | Sahu | G06F 9/5027 |

OTHER PUBLICATIONS

Gholamhosseinian et al., "Cloud Computing and Sustainability: Energy Efficiency Aspects," Thesis for the degree of Master of Computer Network Engineering, Halmstad University, School of Information Science, Computer and Electrical Engineering, Feb. 2012, 104 pages.

Goncalves, Jr. et al., "A Multi-Criteria Approach for Assessing Cloud Deployment Options Based on Non-Functional Requirements," Proceedings of the 19th Symposium on Interactive 3D Graphics and Games, Apr. 13, 2015, 1383-1389.

Jammal et al., "Evaluating High Availability-Aware Deployments Using Stochastic Petri Net Model and Cloud Scoring Selection Tool," IEEE Transactions on Services Computing, Jan./Feb. 2021, 14(1):141-154.

* cited by examiner

Customer Preferences Profiles

| | |
|---|---|
| Green Enterprise: | 1. Energy consumption; 2. Cost; 3. Transactions; 4. Availability; 5. Capacity |
| Gray Enterprise: | 1. Cost; 2. Energy consumption; 3. Transactions; 4. Availability; 5. Capacity |
| Blue Enterprise: | 1. Transactions; 2. Energy consumption; 3. Cost; 4. Availability; 5. Capacity |

Alternative Builder

| Name | Web/Ve | Type of Instance | # of Instances | Application Server Vendor | Type of Instance | # of Instances | DB Server Vendor | Type of Instance | # of Instances | Green Profile Score |
|---|---|---|---|---|---|---|---|---|---|---|
| A+C+E:1 | A | a1.medium | 4 | C | a1.large | 6 | E | a1.xlarge | 5 | 61.09% |
| A+C+E:2 | A | a1.large | 5 | C | a1.xlarge | 8 | E | a1.2xlarge | 4 | 57.89% |
| A+C+E:3 | A | a1.2xlarge | 6 | C | a1.2xlarge | 10 | E | a1.2xlarge | 5 | 48.03% |
| A+C+F:1 | A | a1.medium | 4 | C | a1.large | 6 | F | a1.xlarge | 5 | 61.01% |
| A+C+F:2 | A | a1.large | 5 | C | a1.xlarge | 8 | F | a1.2xlarge | 4 | 62.40% |
| A+C+F:3 | A | a1.2xlarge | 6 | C | a1.2xlarge | 10 | F | a1.2xlarge | 5 | |
| A+D+E:1 | A | a1.medium | 4 | D | a1.large | 6 | E | a1.xlarge | 5 | 60.95% |
| A+D+E:2 | A | a1.large | 5 | D | a1.xlarge | 8 | E | a1.2xlarge | 4 | 57.75% |
| A+D+E:3 | A | a1.2xlarge | 6 | D | a1.2xlarge | 10 | E | a1.2xlarge | 5 | 47.84% |
| A+D+F:1 | A | a1.medium | 4 | D | a1.large | 6 | F | a1.xlarge | 5 | 60.90% |
| A+D+F:2 | A | a1.large | 5 | D | a1.xlarge | 8 | F | a1.large | 6 | 57.77% |
| A+D+F:3 | A | a1.2xlarge | 6 | D | a1.2xlarge | 10 | F | a1.xlarge | 5 | 46.12% |
| B+C+E:1 | B | a1.medium | 4 | C | a1.large | 6 | E | a1.xlarge | 5 | 63.31% ☆ |
| B+C+E:2 | B | a1.large | 5 | C | a1.xlarge | 8 | E | a1.2xlarge | 4 | 57.81% |
| B+C+E:3 | B | a1.2xlarge | 6 | C | a1.2xlarge | 10 | E | a1.2xlarge | 5 | 47.93% |
| B+C+F:1 | B | a1.medium | 4 | C | a1.large | 6 | F | a1.xlarge | 5 | 63.23% |
| B+C+F:2 | B | a1.large | 5 | C | a1.xlarge | 8 | F | a1.2xlarge | 4 | 53.38% |
| B+C+F:3 | B | a1.2xlarge | 6 | C | a1.2xlarge | 10 | F | a1.xlarge | 5 | |
| B+D+E:1 | B | a1.medium | 4 | D | | | | | | 63.70% |
| B+D+E | | | | | | | | | 5 | |
| B+D+E | | | | | | | | | 5 | |
| B+D+F | | | | | | | | | 4 | |
| B+D+F:1 | B | a1.2xlarge | 6 | D | a1.2xlarge | 10 | F | a1.2xlarge | 5 | |

(a — Alternatives for software component and deployment choices)

*FIG. 6A*

| Name | Green Profile Score | Grey Profile Score | Blue Profile Score | Wasted Carbon Emission Debt (W-CED) | Actual Carbon Emission Debt (A-CED) |
|---|---|---|---|---|---|
| A+C+E : 1 | 61.09% | 62.75% | 50.73% | ☆ 0.00 | 63.70 |
| A+C+F : 1 | 61.01% | 62.66% | 50.66% | 0.10 | 63.80 |
| A+D+E : 1 | 60.98% | 62.63% | 50.64% | 0.18 | 63.88 |
| A+D+F : 1 | 60.90% | 62.53% | 50.58% | 0.28 | 63.98 |
| B+C+E : 1 | ☆ 63.31% | 64.96% | 54.49% | 0.08 | 63.78 |
| B+C+F : 1 | 63.23% | 64.87% | 54.42% | 0.18 | 63.88 |
| B+D+E : 1 | 63.20% | 64.84% | 54.40% | 0.26 | 63.96 |
| B+D+F : 1 | 63.12% | 64.74% | 54.34% | 0.36 | 64.06 |

*FIG.6B*

ESTIMATING AND IMPROVING RESIDUAL CARBON DEBT IN CLOUD-BASED APPLICATIONS

CROSS-REFERENCE TO RELATED APPLICATION

This application claims the benefit of U.S. Provisional Application No. 63/166,163, filed Mar. 25, 2021, the contents of which are incorporated by reference herein.

TECHNICAL FIELD

This disclosure generally relates to cloud computing.

BACKGROUND

Cloud computing provides for on-demand availability of computer system resources, especially data storage and computing power, without direct active management by the user. Cloud-based applications may be enabled through cloud computing. For example, a cloud-based application may allow users to use the cloud-based application without requiring the users to actively manage which computer system resources provide computing power and data storage used by the cloud-based application.

SUMMARY

In general, an aspect of the subject matter described in this specification may determine a cloud architecture that reduces carbon emission debt. A carbon emission debt can be an imbalance between the carbon footprint of a particular country, group, person, etc. and any carbon offsetting that has been agreed or undertaken to counteract the carbon footprint. Enterprises following carbon neutrality goals may aim at offsetting their carbon emission by activating or sponsoring processes that reduce their carbon debt, in addition to reduction of the compute utilization that is proportional to the number and type of active servers. The disclosed embodiments may be implemented to reduce carbon debt, reduce computing resources and utilization.

A system may provide a calculator for cloud environments that estimates the cloud vendor and the solution architecture parts in energy consumption, and the amount of carbon emission that can be reduced as a direct result of modifying the solution architecture logical design and Information Technology (IT) deployment. In addition, the system may provide techniques and tools for evaluation and gradual relaxation of quality attributes requirements in order to reduce the carbon debt. According to the enterprise energy and overall quality profiles, the calculator may evaluate architecture blueprint topology, such as a three-tier architecture, compare and score architecture design specifications according to combinations of software components, vendor implementations, and compute and store selected infrastructure. The results may indicate that classical reduction of compute demand does not always decrease the carbon footprint, and that increasing computer power does not always increase the overall architecture score.

In some aspects, the subject matter described in this specification may be embodied in methods that may include the actions of obtaining candidate cloud deployment architectures; obtaining a set of requirements for quality attributes, each requirement corresponding to a respective quality attribute of the candidate cloud deployment architectures; selecting, from the candidate cloud deployment architectures, a particular cloud deployment architecture for implementation based on the set of requirements for the quality attributes; determining a wasted carbon emission debt for the particular cloud deployment architecture; selecting a requirement corresponding to a particular quality attribute to adjust based on the wasted carbon emission debt; and providing, for output, an adjusted requirement corresponding to the particular quality attribute.

These and other embodiments can each optionally include one or more of the following features. In some implementations, determining the wasted carbon emission debt includes: determining a theoretical carbon emission debt for the candidate cloud deployment architecture having the minimal carbon emission footprint; and determining an actual carbon emission debt for the particular cloud deployment architecture. The wasted carbon emission debt includes a difference between the actual carbon emission debt and the theoretical carbon emission debt.

In some implementations, determining the theoretical carbon emission debt for the candidate cloud deployment architecture having the minimal carbon emission footprint includes: determining, for each candidate cloud deployment architecture, a respective value for a first quality attribute of carbon emission; selecting the candidate cloud deployment architecture having the lowest respective value for the first quality attribute; and defining the theoretical carbon emission debt as the lowest respective value for the first quality attribute.

In some implementations, selecting the requirement corresponding to a particular quality attribute to adjust based on the wasted carbon emission debt includes: determining a quality attribute having a highest impact on carbon emission debt; determining a proposed adjusted requirement corresponding to the quality attribute; determining an expected change in carbon emission debt for the proposed adjusted requirement for the particular cloud deployment architecture; and based on determining that the expected change in the carbon emission debt exceeds a specified threshold change, selecting to adjust the requirement for the quality attribute to the proposed adjusted requirement.

In some implementations, selecting the requirement corresponding to a particular quality attribute to adjust based on the wasted carbon emission debt includes: selecting a quality attribute; determining a proposed adjusted requirement corresponding to the quality attribute, determining a quality score for the particular cloud deployment architecture with the proposed adjusted requirement applied to the selected quality attribute; determining that the particular cloud deployment architecture with the proposed adjusted requirement applied to the selected quality attribute reduces the wasted carbon emission debt of the particular cloud deployment architecture; and based on determining that the quality score for the particular cloud deployment architecture exceeds a specified threshold quality score, selecting to adjust the requirement for the quality attribute to the proposed adjusted requirement.

In some implementations, selecting a particular cloud deployment architecture for implementation based on the set of requirements for the quality attributes includes: determining a quality score for each of the candidate cloud deployment architectures; and selecting the particular cloud deployment architecture based on the quality score.

In some implementations, determining the quality score for a candidate cloud deployment architecture includes: for each of the quality attributes: determining, based on the corresponding requirement, an optimal value for the quality attribute; and determining a quality attribute score by normalizing a value of the quality attribute for the candidate cloud deployment architecture relative to the optimal value for the quality attribute.

In some implementations, determining the quality score for a candidate cloud deployment architecture includes: determining a respective weight of importance of each quality attribute; weighting the quality attribute scores for each of the quality attributes based on the respective weight of importance; and summing the weighted quality attribute scores for the candidate cloud deployment architecture.

In some implementations, the actions include providing graph data defining a graph including nodes and edges connecting between the nodes. The nodes include a first set of nodes representing software components and a second set of nodes representing potential deployment targets for the software components. Each candidate cloud deployment architecture includes at least one node of the first set of nodes and at least one node of the second set of nodes. Each edge represents an interdependency between nodes. The actions include determining, for each candidate cloud deployment architecture and based on the graph data, a value of each quality attribute; and determining a quality score for each candidate cloud deployment architecture based on the value of each quality attribute for the candidate cloud deployment architecture.

In some implementations, determining a value of a quality attribute for a candidate cloud deployment architecture based on the graph data includes: determining, for each node of the candidate cloud deployment architecture, a value of the quality attribute based on the interdependencies represented by edges connected to the node; and aggregating the values of the quality attributes for the nodes of the candidate cloud deployment architecture.

In some implementations, determining a quality score for a candidate cloud deployment architecture based on the value of each quality attribute includes determining whether the value of each quality attribute satisfies the corresponding requirement.

In some implementations, each requirement of the set of requirements includes a range of values for the corresponding quality attribute.

In some implementations, providing the adjusted requirement includes relaxing the requirement.

In some implementations, each candidate cloud deployment architecture includes a set of software components and a respective deployment target for each software component.

In some implementations, each deployment target includes a virtual machine, a physical machine, or a container.

In some implementations, the particular cloud deployment architecture includes a first set of software components and a respective deployment target for each software component of the first set of software components.

In some implementations, the method includes deploying the particular cloud deployment architecture by instantiating each software component of the first set of software components on the respective deployment targets.

In some implementations, the quality attributes include one or more of energy consumption, capacity, transaction rate, cost rate, and availability of the candidate cloud deployment architectures.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIG. 6B illustrates an example table of profile scores of application deployment choices.

Like reference symbols in the various drawings indicate like elements.

DETAILED DESCRIPTION

Figure 1A:
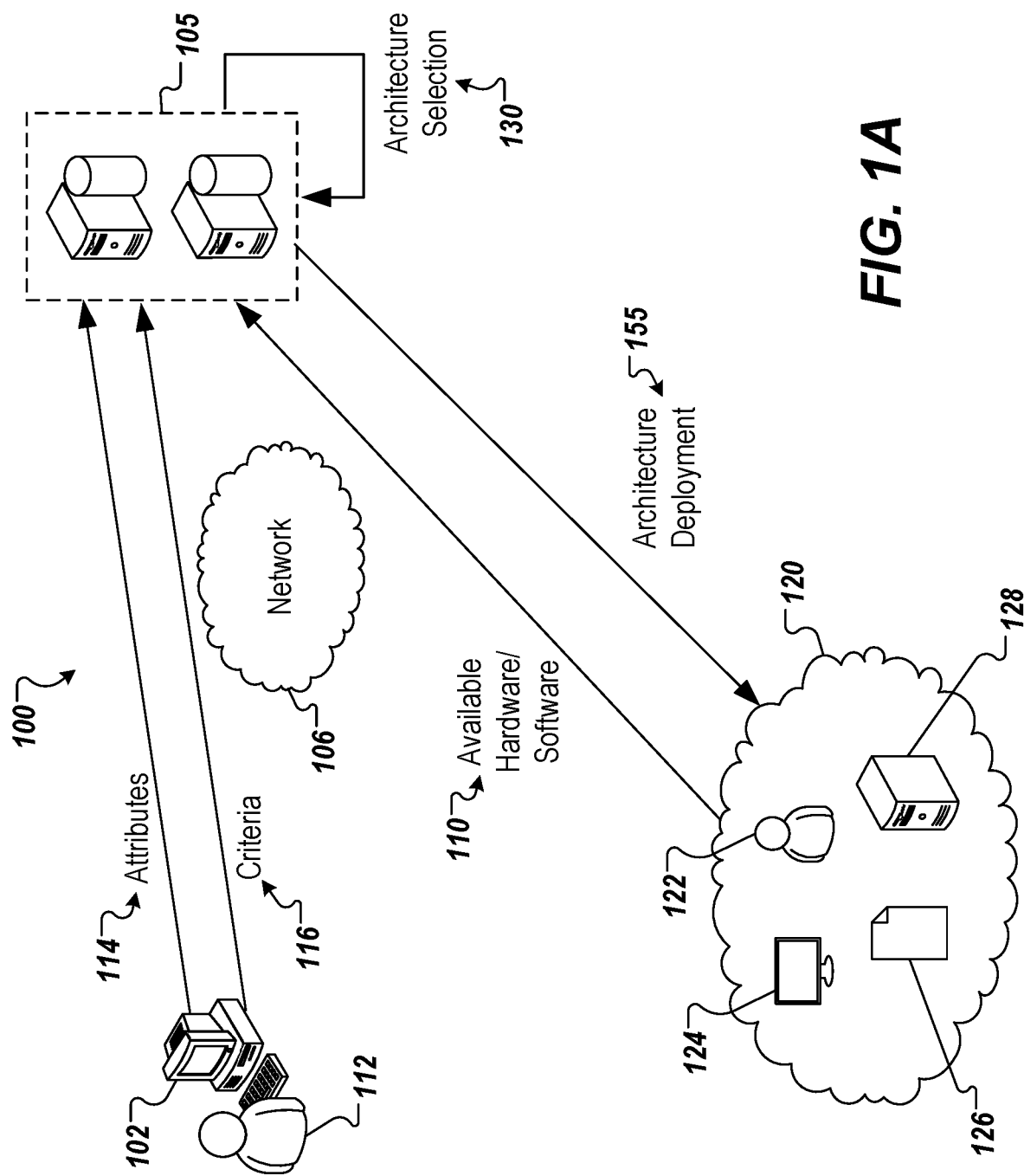
FIG. 1A illustrates an example system for estimating and improving residual carbon debt in cloud-based applications.

One of the goals of improving sustainability relates to the reduction of carbon emission due to consumption of polluting energy. Enterprises following carbon neutrality goals, also referred as net zero emission, aim at offsetting their carbon emission by activating or sponsoring processes that reduce existing greenhouse gases in the atmosphere. A contributing element to this carbon emission relates to the amount and type of energy an enterprise IT and its service computing consumes.

In particular, the compute utilization, power, and cooling parts may constitute about 45-65% of the total energy of the datacenter that is proportional to the number of servers running. Yet, a challenging aspect is to estimate and constantly reduce the amount of carbon offset the enterprise reports on and acts upon, whether generated directly by the enterprise compute resources, or created by its supply chain and cloud providers. Such reduction outcome may be a direct result of solution architecture logical design and IT deployment choices. Specifically, an enterprise may need to have transparent estimation for the carbon-offset range between the minimal carbon level possible for a feasible solution and the one most likely be implemented.

Software deployment and configuration architects often contemplate on design alternatives of the solution architecture that vary in pure compute versus native cloud services utilization, third party integration network implications and selection of logical and physical components. A feasible solution may be one that complies and adheres to functional and quality requirements, such as cost rate (e.g., cost per hour), transaction rate (e.g., transactions per minute), and system availability, as well as energy consumption and carbon emission footprint. A solution that may be chosen is the one that has the highest aggregated score considering the proportional importance of its quality attributes.

Feasible cloud deployment solutions may leverage cloud providers capabilities such as dynamic provisioning of resources to match workload and transaction capacity, leading to overall solution efficiency and quality. Application owners may drive further reduction by implementing structural changes to their software application and reduce energy consumption of some or all sources. In addition, an enterprise can have transparency into architecture elements and understand which quality requirements can be relaxed in order to reduce the total residual carbon debt. Hence, an enterprise may be able to estimate how much residual carbon offset the enterprise can control and optimize, and what part may be optimized by the cloud provider.

Cloud providers may constantly optimize their infrastructure power type by advancing to carbon-free energy. Amazon is using global wind farms and solar farms. Microsoft has solar farms in North Carolina and oceanic floor, and IBM is using its wasted datacenter energy to heat a swimming pool in Zurich. Similarly, solution architects may evolve their relative part affecting the carbon emission debt regarding a specific solution design. Even more so, an existing on-premises solution with measured carbon emission debt may be constantly optimized towards a pure cloud native solution, after initial lift-and-shift IT transition.

As an example, of several types of migration to a cloud solution, the easiest migration may be a lift-and-shift of legacy infrastructure such as packaged within virtual machines (VMs) or containers and move the workload to the cloud. Another type of change is lift-and-optimize, where one replaces some of the underlying software components with cloud native services. A third is a hybrid combination of both cloud and on-premises. A fourth is Platform-as-a-service (PaaS) oriented, in which the entire application is created and developed on the cloud, in a DevOps manner. Finally, a cloud-to-cloud migration may be performed when there is a need to replace some of underlying native services of one cloud provider with another.

All those changes can manifest differently according to application variations and consumptions modes, according to the target client preferences. As the underlying quality attributes of the software architecture, including its energy consumption and energy type, change and evolve, the attributes affect the amount of carbon emitted and the offsetting magnitude. As a need to optimize the economics of sustainability, gradual refactoring may transfer the carbon offset debt to the cloud provider that invests considerably either in green energy or renewable energy credit.

Reducing carbon emission may require a company to be aware of its current carbon footprint and be confident in its ability to reduce that debt. Merging carbon emission debt footprint with measured architecture quality may assist in having evidence-based debate and design review on the selected road and incremental changes. An automated calculator can support such debates and direct which quality requirements can be relaxed, as well as evaluate the needed carbon offsetting debt reduction and resulting business impact. Such an automation, once configured with relevant quality criteria, can become an integral part of IT monitoring dashboards, proactively indicating recommendations for cloud deployment evolution.

FIG. 1A depicts an example system 100 in accordance with implementations of the present disclosure. In the depicted example, the example system 100 includes a client device 102, a network 106, and a server system 105. The server system 105 includes one or more server devices and databases (e.g., processors, memory). In the depicted example, a user 112 interacts with the client device 102.

In some examples, the client device 102 can communicate with the server system 105 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 105 includes at least one server and at least one data store. In the example of FIG. 1, the server system 105 is intended to represent various forms of servers including, but not limited to a web server, an application server, a proxy server, a network server, and/or a server pool. In general, server systems accept requests for application services and provide such services to any number of client devices (e.g., the client device 102 over the network 106). In accordance with implementations of the present disclosure, and as noted above, the server system 105 can host an agile security platform.

In the example of FIG. 1A, an enterprise network 120 is depicted. The enterprise network 120 represents a network implemented by an enterprise to perform its operations. In some examples, the enterprise network 120 represents on-premises systems (e.g., local and/or distributed), cloud-based systems, and/or combinations thereof. In some examples, the enterprise network 120 includes IT systems and OT systems. In general, IT systems include hardware (e.g., computing devices, servers, computers, mobile devices) and software used to store, retrieve, transmit, and/or manipulate data within the enterprise network 120. In general, OT systems include hardware and software used to monitor and detect or cause changes in processes within the enterprise network 120 as well as store, retrieve, transmit, and/or manipulate data. In some examples, the enterprise network 120 includes multiple assets. Example assets include, without limitation, users 122, computing devices 124, electronic documents 126, and servers 128.

In general, the system 100 can be implemented to select and deploy cloud architectures in the enterprise network 120. The server system 105 can receive, as input, attributes 114 and criteria 116 for the attributes 114. The attributes 114 and criteria 116 can be provided as input to the client device 102 by the user 112.

The attributes 114 can include, for example, energy consumption, energy type, as availability, recovery, capacity, transaction load, cost, and security. The criteria 116 can include valid ranges for each of the attributes 114. In some examples, the criteria 116 can be expressed as a set of non-functional requirements (NFRs).

Figure 3:
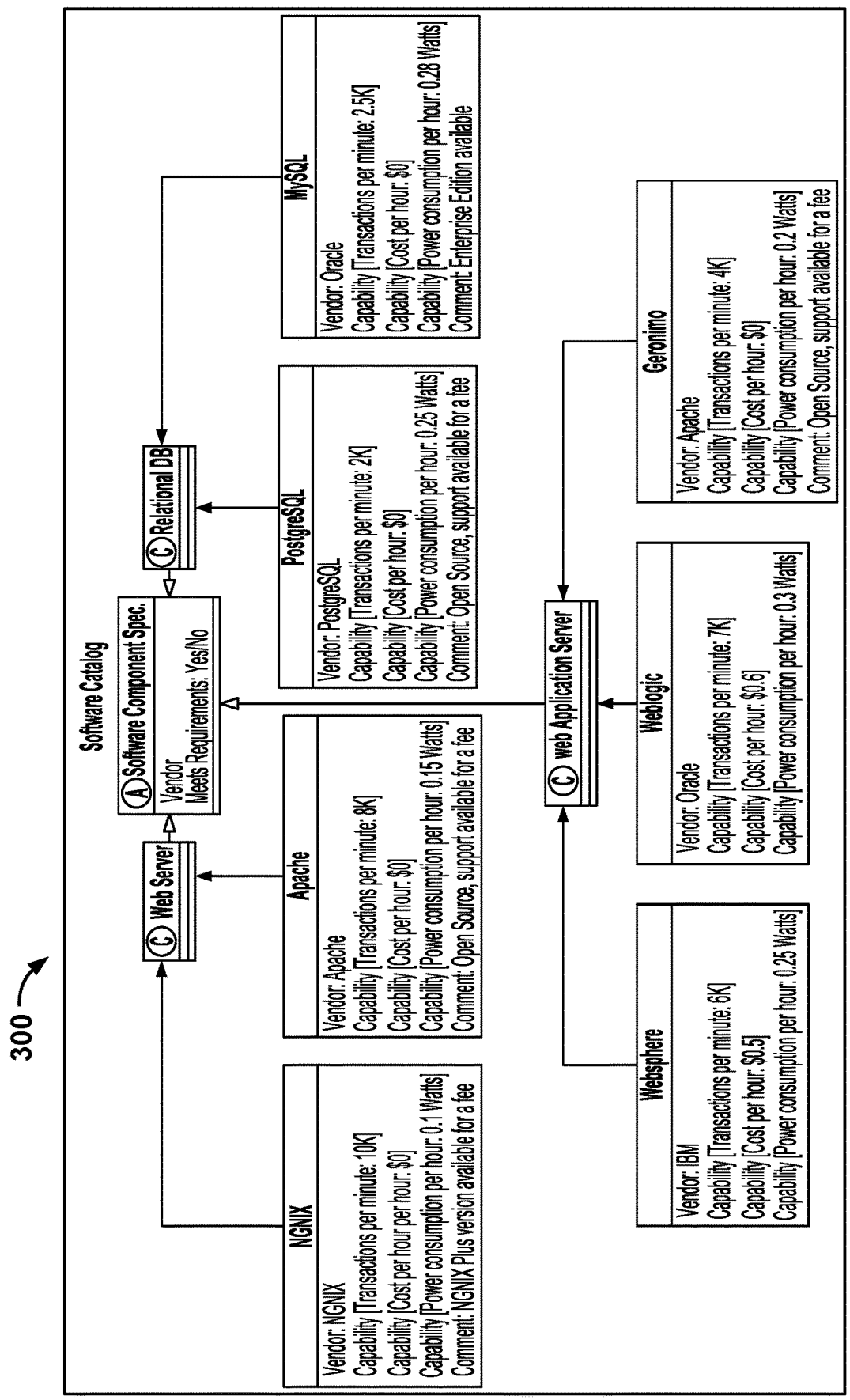
FIG. 3 illustrates a block diagram of an example software catalog.
Figure 4:
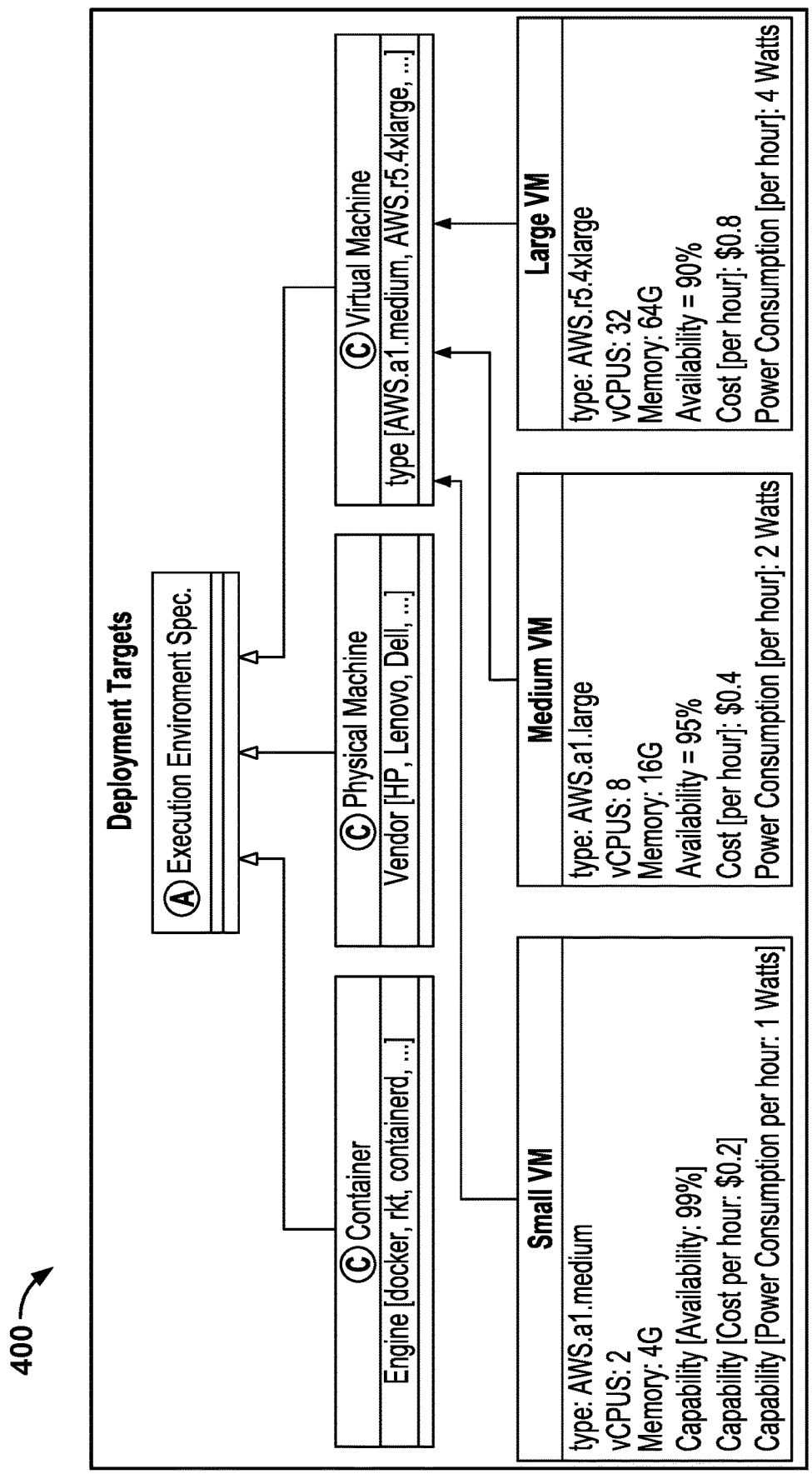
FIG. 4 illustrates a block diagram of an example set of virtual machine deployment options.

The server system 105 can receive, as input, data indicating available hardware and software 110. The available hardware and software 110 can be determined based on one or more catalogs. FIG. 3 illustrates a block diagram of an example software catalog including available software. FIG. 4 illustrates a block diagram of an example catalog of VM deployment options including available hardware 111.

The server system 105 can select 130 a solution architecture that reduces resulting carbon emission, while adhering to requirements for the attributes 114, as defined by the criteria 116. As a potential deployment of a software solution over cloud environments has multiple quality attributes criteria, the principles of Multi-Criteria Decision Analysis (MCDA) may be employed. MCDA and alternative scoring methods usually include several stages: alternatives' formulation and criteria selection, criteria weighting, evaluation, and final recommendation. Processes for architecture selection 130 are described in greater detail with reference to FIG. 1B.

The server system 105 can output an architecture deployment 155 including selected software and hardware of the selected architecture. In some examples, the server system 105 generates a machine readable file describing the configuration of the selected architecture, e.g., as a DevOps script. In some examples, the enterprise network 120 can be automatically reconfigured based on the architecture deployment 155 according to the generated file.

The evaluation may be done based on ranking a criterion score relative to requirements range. The recommendation goal aims at directing which quality requirement range should be further relaxed in order to reduce the residual carbon debt, W-CED, computed as the difference between a selected solution architecture A-CED, and the minimal possible debt T-CED. This is while recalling that the reduction of residual waste and energy utilization is client dependent providing different criteria weights of quality attributes such as availability, recovery, capacity, transaction load, cost and security.

Cloud providers may constantly optimize their services by introducing carbon-free energy and by encapsulating the service's actual carbon emission offset cost in their pricing model. As such, once changes in the cloud provider infrastructure are introduced, solution architects may evolve their existing architecture, and delegate their direct responsibility of carbon emission offset to the cloud supply chain, focusing on the architecture functionality attributes.

Figure 1B:
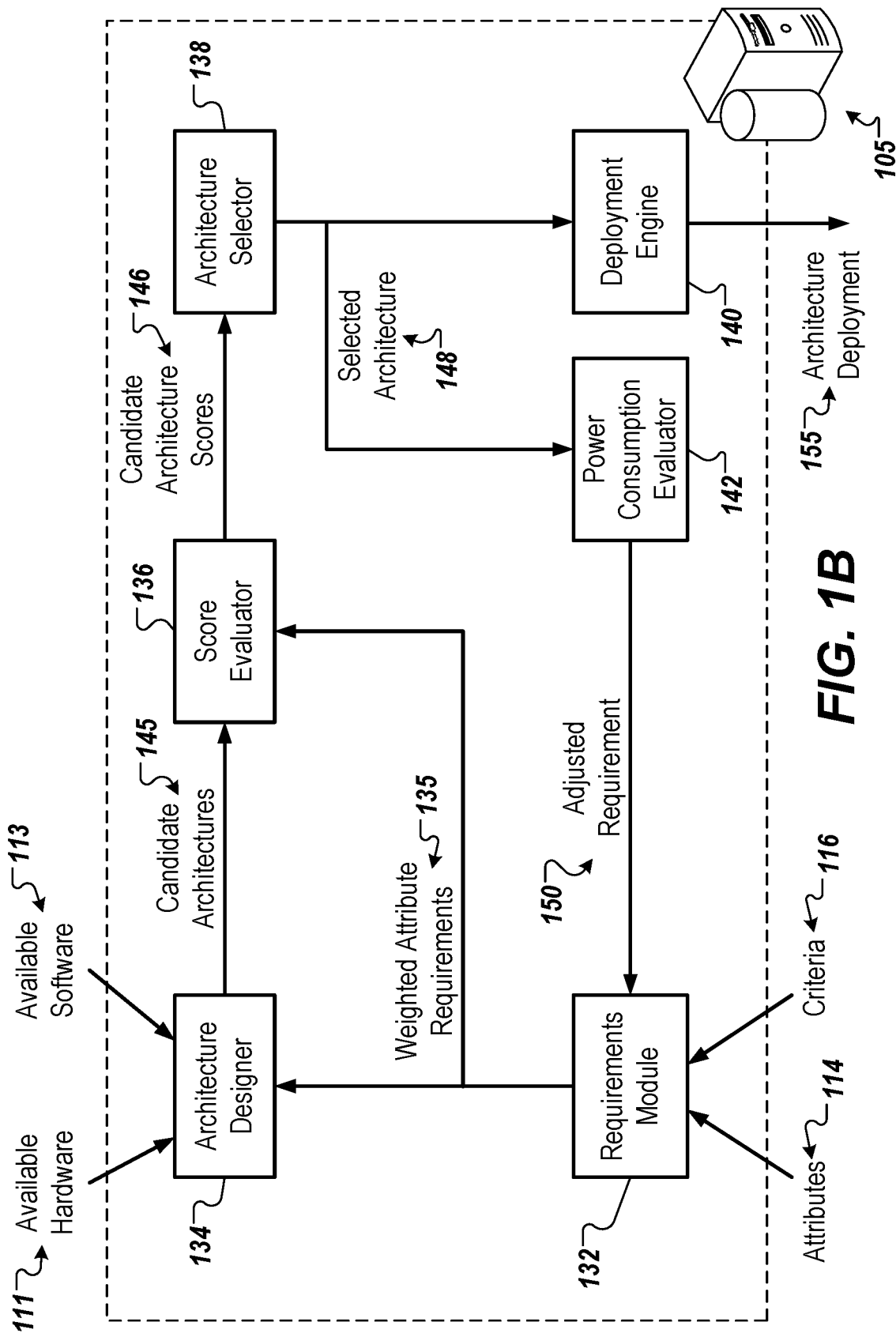
FIG. 1B illustrates an example server system in accordance with implementations of the present disclosure.

FIG. 1B illustrates an example server system 105. The server system 105 includes a requirements module 132, an architecture designer 134, a score evaluator 136, and an architecture selector 138. The server system 105 also includes a power consumption evaluator 142 and a deployment engine 140.

In general, the server system 105 can perform iterative operations in a criteria relaxation process. The requirements module 132 can receive data representing the attributes 114 and the criteria 116. The attributes 114 and the criteria 116 for the attributes define the requirements ranges for the most important quality attributes of the solution architecture.

According to a multi-dimension criteria subjective prioritization, the requirements module 132 can compute weights of importance for the different quality attributes. In some examples, criteria weights can be determined based on user input using a subjective pair-wise voting method where participants compare the importance of two criteria at a time. A voting scale in which one and zero represent which criterion is more important than the other may be used. However, actual weights may be customized with each client. As an example, an eco-aware enterprise, denoted as Green, may set equal or higher weight to sustainability compound criterion compared to other non-functional criteria. Another enterprise, denoted as Gray, may prioritize overall cost of the solution, and yet another enterprise, denoted as Blue, may prioritize performance, i.e., transaction support and maximum availability over sustainability.

The requirements module 132 can store data indicating the weights for the quality attributes. The weights can be customized for various clients based on individual preferences. The requirements module 132 can apply the weights to the attributes 114 and criteria 116 and can output weighted attribute requirements 135 to the architecture designer 134 and the score evaluator 136.

The architecture designer 134 can select software components and potential resources instances that comply and adhere to the requirements ranges. For example, the architecture designer can design architectures based on the available hardware 111 and the available software 113. The architecture designer 134 can then design several feasible architecture alternatives composed of the instances of available hardware 111 and available software 113 that satisfy the weighted attribute requirements 135. The architecture designer 134 can output candidate architectures 145 to the score evaluator 136.

The score evaluator 136 can determine scores for the candidate architectures 145 based on the weighted attribute requirements 135. The score evaluator 136 can determine an accumulated carbon emissions of the feasible architecture alternatives based on overall power consumption of deployed instances on selected cloud technologies and configurations. The score evaluator 136 can aggregate the relevant quality attributes values of the selected instances and provide aggregated score at the solution level, and according to the solution deployment blueprint composition.

To determine candidate architecture scores 146, the score evaluator 136 can normalize each quality attribute value relative to the absolute distance from the desired threshold or location within the requirements range of quality attribute i, of an alternative j. For example, if the provided lower range boundary is the minimal value required, and the higher range boundary is the optimal one, QScore can be defined as follows:

$$QScore_{ji} = \frac{|QValue_{ji} - QLR_i|}{Range_i} \quad \text{Eq. 1}$$

where QScore is the Quality Attribute Score of quality attribute i, of an feasible solution architecture alternative j, $QValue_{ji}$ is the Quality Attribute Value of specific attribute i of alternative j, $QLR_i$ is the Quality Attribute Requirement lower range value of attribute i. $Range_i$ is the absolute range size defined as:

$$Range_i = |QLR_i - QHR_i| \qquad \text{Eq.2}$$

where $QHR_i$ is the Quality Attribute Requirement higher range value of attribute i. If the provided lower range boundary is the optimal requirements value, and the higher range boundary is the minimal one, the score can be adjusted as:

$$QScore_{ji}^* = 1 - QScore_{ji} \qquad \text{Eq.3}$$

If no optimal level of a range is defined, and a threshold is needed to be passed or bound a certain level, the maximum distance of the best ranked alternative can be defined as an optimal range distance from the threshold, hence $$QHR_i = \max_j QValue_{ji}. \qquad \text{(Eq 4)}$$

for all j alternatives.

The architectures may be ranked and compared using multi-criteria definition and subjective weights of quality attributes. According to be the defined weights, the score evaluator 136 can calculate the weighted average and score for each alternative.

$$QScore_j = \Sum_{i-1}^n Weight_i * QScore_{ji} \qquad \text{Eq 5}$$

where n is the number of quality attributes, and $Weight_i$ is the weight defined for quality attribute i.

The candidate architectures 145 can be ranked by measuring quality attributes, fulfilling the NFRs. As an example, a specific architecture deployment alternative can provide fewer concurrent transactions by activating fewer servers in parallel in terms of load balancing, and hence have a smaller carbon emission footprint. Another example is providing higher volume of transactions by utilizing carbon-free energy. All alternatives may need to satisfy the defined minimal acceptable levels of NFRs, within a defined range, or above or below a certain threshold.

In some examples, a particular candidate architecture having the best carbon emission criteria score compared to other candidate architectures 145 may be set as a baseline for the minimal investment for carbon offset debt, and the implemented candidate architecture may represent the carbon gap that can be reduced further.

The score evaluator 136 can output candidate architecture scores 146 to the architecture selector 138. The architecture selector 138 can output a selected architecture 148 to be implemented based on the quality requirements and relevant $QScore_j$. In some examples, the architecture selector 138 can output the selected architecture 148 to a deployment engine 140. The deployment engine 140 can perform an architecture deployment 130, e.g., by deploying the selected architecture 148 for implementation by the enterprise network 120.

The power consumption evaluator 142 can evaluate the selected architecture 148 to determine possible adjustments of quality attribute requirements. Amongst the candidate architectures 145, one architecture will have the minimal aggregated carbon emission footprint, whereas the selected architecture 148 will have the same or higher carbon footprint. This net-zero emission Theoretical solution related to Carbon Emission Debt (CED) may be defined as T-CED, as it represents the economic value of carbon emission to offset. Similarly, the active deployment architecture will have an Active CED (A-CED). The difference between the T-CED and the A-CED, can be used to estimate the Waste CED controlled by the enterprise (W-CED) and may be controlled and reduced by the solution architect. Cloud providers control the cloud infrastructure, the utilization of carbon-free energy, or the Renewable Energy Credits (REC) they either produce or buy for carbon offset. Cloud providers can even bundle into their PaaS, SaaS, and FaaS pricing, the relative cost of REC. Thus, enterprises can delegate the offsetting operation and focus on reporting and auditing for compliance needs.

The power consumption evaluator 142 can define T-CED as the absolute $QValue_j$ of alterative j, for the solution that its i quality attribute is the carbon emission or energy consumption is minimal across all alternatives.

$$T\text{-}CED = \min_j QValue_j \cdot \text{Power\_Consumption} \qquad \text{Eq 6}$$

for all j. T-CED defines the definite commitment to perform carbon offset by the enterprise and can be reduced by delegating components to be controlled by the cloud providers.

The power consumption evaluator 142 can define A-CED the absolute $QValue_j$ of alterative j that was selected to be implemented $$A\text{-}CED_j = QValue_j \cdot \text{Power\_Consumption} \qquad \text{Eq 7}$$

for all j, where j is the selected to be implemented alternative. A-CED defines the current carbon emission offset to be handled by the enterprise.

The power consumption evaluator 142 can calculate W-CED as the wasted carbon emission debt that should be optimized as:

$$W\text{-}CED = A\text{-}CED - T\text{-}CED \qquad \text{Eq 8}$$

W-CED defines the limits of carbon emission offset cost and optimizations the enterprise can perform, without changing the essence of the solution for native cloud services.

Consequently, the A-CED, and the total carbon offset debt, can be reduced even further. In some examples, the range of the residual emissions can be reduced by selecting a different candidate architecture 145 with lower emission values, or by relaxing other quality attributes requirements range.

Changes in the underlying measured or employed infrastructure and cloud provider services, which may indicate gradual decrease in absolute carbon emission value, can be periodically evaluated and reduce the cost of net zero emission. The resulting simulation can also evaluate which quality requirements can be further relaxed, such that the overall carbon debt may be reduced with new feasible solutions.

The power consumption evaluator 142 can examine relaxation options for some quality attributes requirements in order to reduce the residual carbon debt. For example, for the most impacting quality attributes, the power consumption evaluator 142 can propose to relax the optimal level of the quality attributes. Accordingly, the proposed relaxation can include reducing either the high $QHR_i$ or increase the $QLR_i$ and re-evaluating the candidate architecture scores 146, while examining the amount of reduced carbon debt. Any measured value that passes the optimal level requested, will score a 100% rating.

The power consumption evaluator 142 can output an adjusted requirement to the requirements module 132. The server system 105 can then select different supporting infrastructure assets, or remove assets, in order to comply with the adjusted requirement 150. For example, the server system 105 can select a different selected architecture 148, including a different combination of available hardware 111 and available software 113, based on the adjusted requirement 150.

The selection process can be repeated for separate quality attributes or compound quality attributes. Examples can be to reduce the maximum required transaction throughput by 50%, increase the allowed cost by 30%, and reduce the availability level needed by 0.02%.

For each repetition, the power consumption evaluator 142 can evaluate the impact of relaxing the quality attributes requirements on the reduction of the residual W-CED, the economical tradeoff of carbon offset, and sustainability benefits. In some examples, the server system 105 can perform an iteration of selecting and evaluating architectures based on a schedule, e.g., at designated time intervals.

Figure 2:
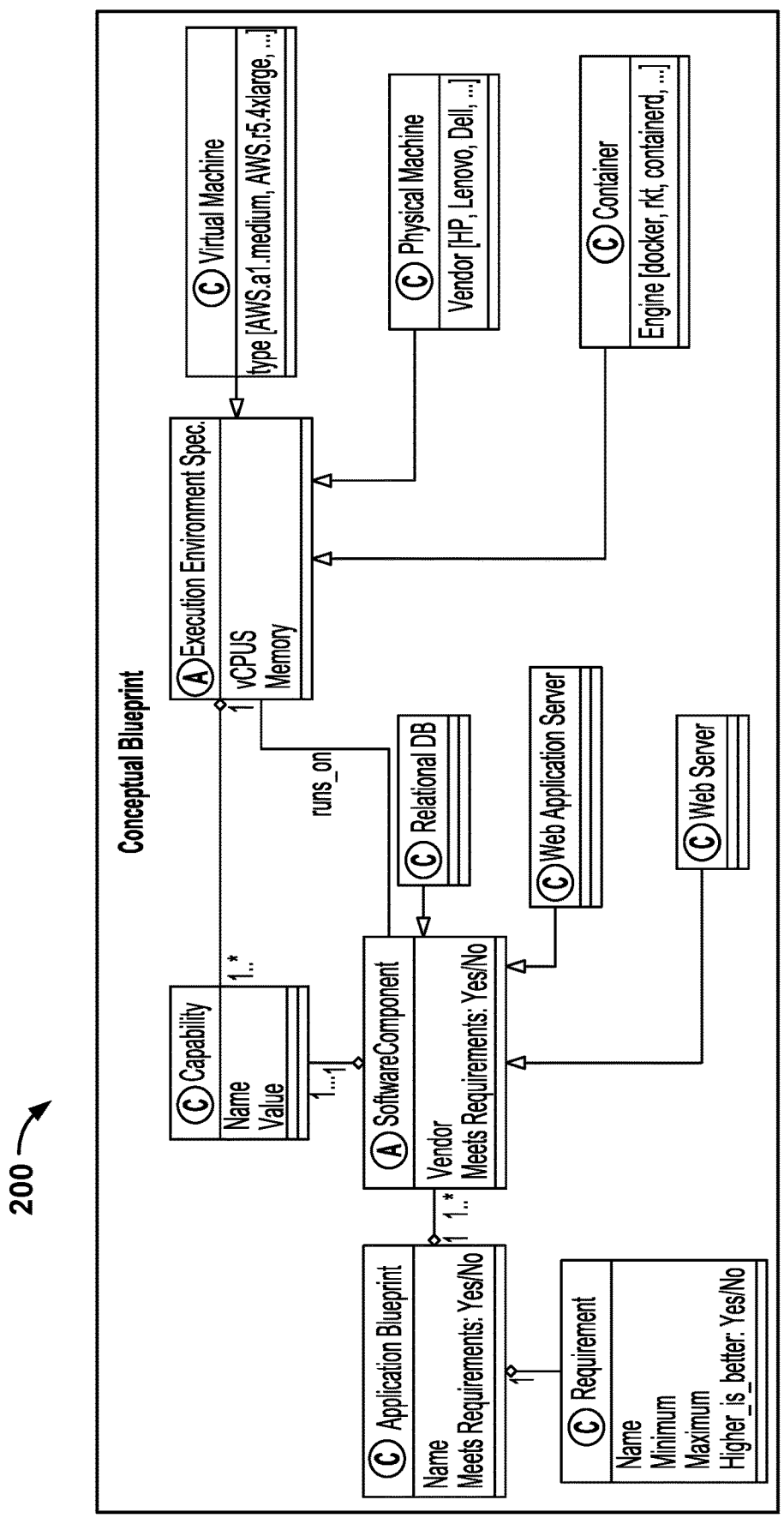
FIG. 2 illustrates a block diagram of an example conceptual blueprint.

FIG. 2 illustrates a block diagram 200 of an example conceptual blueprint. Evaluating feasible solutions according to quality attributes may use a conceptual model for comparison. The conceptual blueprint in FIG. 2 shows an application that requires a set of software components implementing specific functionalities, and adheres to a set of non-functional requirements (NFR). NFRs may contain valid ranges and an optimization flag indicating preferences towards below or above the range's boundaries. A software component that implements functionality may have a set of quality capabilities, which capture what the software component can deliver when deployed on a selected execution environment. An execution environment may have a set of quality capabilities as their inner properties.

FIG. 3 illustrates a block diagram 300 of an example software catalog. The deployment architect's role may be to select software components from a software catalog. FIG. 3 shows representative values of existing software component specifications. In addition, the architects may match execution environments as depicted in FIG. 4 to form a permutation that can adhere to all the requirements as specified in the application concrete blueprint shown in FIG. 5.

FIG. 4 illustrates a block diagram 400 of an example set of VM deployment options. The block diagram of FIG. 4 shows example real costs extracted from Amazon Web Services (AWS) EC2 site, where the power consumption numbers may be arbitrarily selected. Different methods for evaluating actual power consumption can be either provided by the cloud provider or estimated empirically. The overall application score may be derived from quality attributes such as number of transactions or percentage of availability or total power used, as well as the type and configuration of the deployment.

Figure 5:
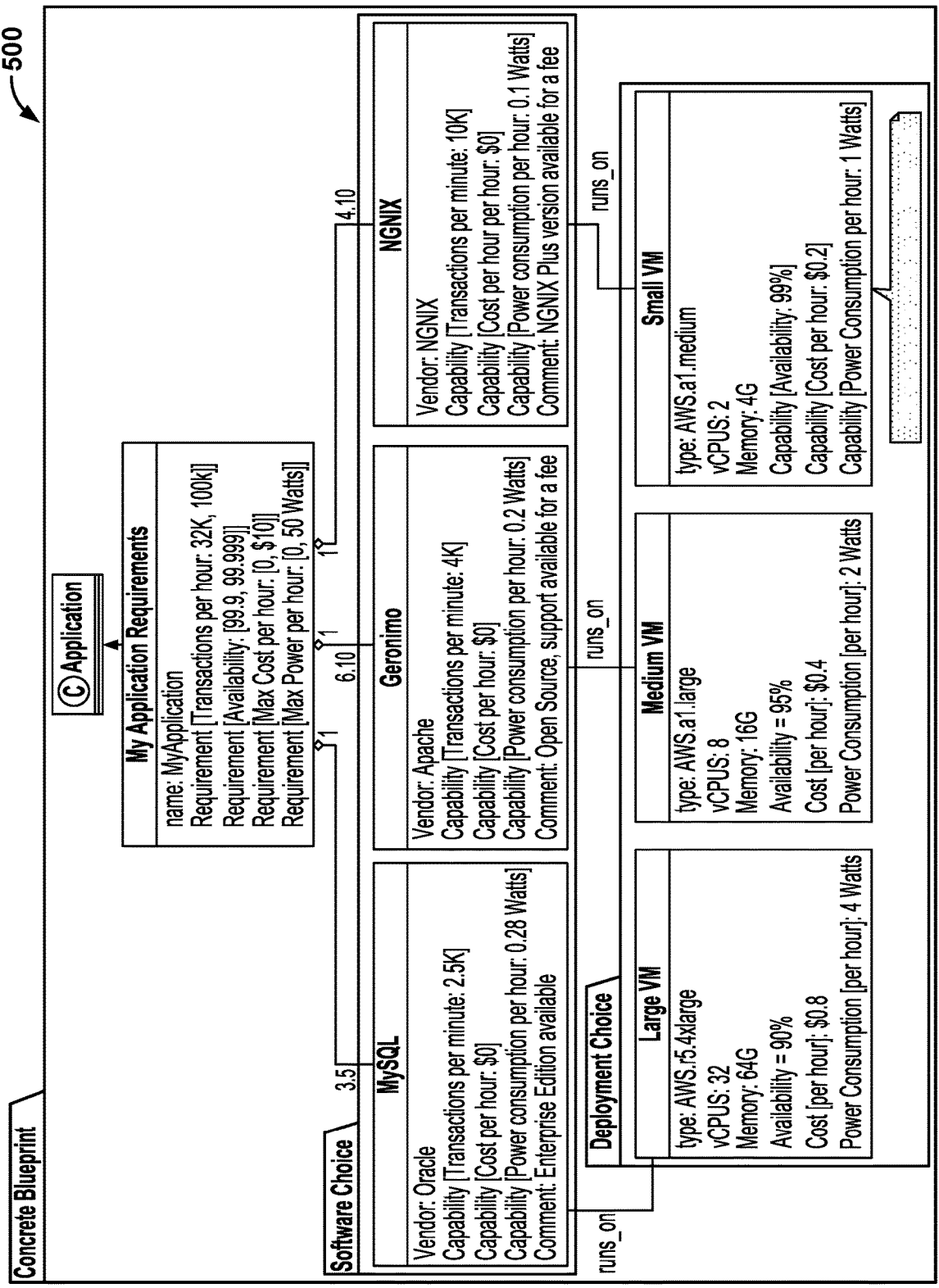
FIG. 5 illustrates a block diagram of an example concrete blueprint.

FIG. 5 illustrates a block diagram 500 of an example concrete blueprint. FIG. 5 shows configuration values of selected technologies that fit within the requirements range. As such, there may be multiple architecture alternatives for each deployment and component's configuration. As an example, the measured availability value may depend on the architecture logical topology and recovery mechanism. In the case of parallel load balancing, the value may be computed as multiplications of availability probability. However, in the case of a pipe and filter topology, the minimum value of availability probability may be selected.

A system may primarily focus on energy consumption and resulting carbon emission relative to overall architecture score based on subjective weighting. The system may assume quality attribute aggregation algorithms per a single attribute are performed at the application level, coupled with a logical and physical architecture. The below describes an example where the system optimizes a portion of a multi-tier web application, where there are several logical components types for a category such as web servers, database servers, application servers, etc. In addition, execution environments may be modeled as VM for a lift-and-shift cloud migration scenario.

As the number of alternatives grows due to variations on cloud services and underlying execution environments, evaluation efforts may become challenging. A carbon neutrality calculator may simplify the process and evaluate ideal deployment versus planed ones. The calculator can support constant adjustments in underlying conditions, requirements, to reevaluate the quality of optional alternatives, compared to an existing one.

The goal of the calculator may be to provide key values for level of carbon emission to offset for the theoretical (T-CED), actual (A-CED), and waste (W-CED) carbon emission debt to manage. For example, given an application with the NFR of Capacity (in GB), Transactions per minute, Availability, Energy Consumption and Cost; one customer may prioritize cost over all others, while another customer may prioritize energy consumptions. Moreover, a single customer may have different priorities for different durations such as day versus night, holiday season versus regular, etc.

As an example, a system may use a simulation of a three-tier web application configured with software components, VM capacity, and cardinality of instances. For the simulation, for each tier in the application, there are two vendors with different capabilities values, and selected VM configurations from Amazon AWS cloud.

Figure 6A:
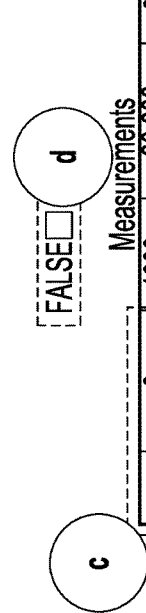
FIG. 6A illustrates an example graphical user interface.

FIG. 6A illustrates an example graphical user interface 600. The graphical user interface may illustrate a snapshot of a main screen of the carbon neutrality calculator, as described above. On the left pane, the user may select a combination of software components, AWS instance type, and number of instances for each tier. As shown in the example of FIG. 6A, there are eight different combinations.

The graphical user interface highlights three panels, alternatives configuration at the left and weighted scores as well as the W-CED and the A-CED at the middle, which are based on the calculation of the NFRs values for each of the selected configurations, presented at the right. The user controls are highlighted in the darkest boxes and (a) enables selection of up to three customer preferences profiles, (b) enables for each tier and for each software combination to select the type and number of AWS VM instances, (c) defines the valid range for each NFR, and (d) provides an option for capping of values outside of range, i.e., if an alternative calculated quality value is higher than the requested range and maximum, it sets the value to the defined maximum for validity. The middle and right panels resulting values are marked with ranges of darker for the best value to white representing the worse. In addition, a resulting ranking that supersede the requirements range is indicated with the darkest background to indicate invalid deployment configuration.

The simulation computation of corresponding NFR values is calculated as follow. Cost and energy consumption defined as:

$$P_t = \Sigma_i N_{ti} * (f(S_{ti}) + f(I_{ti}))  \quad \text{Eq 9}$$

where $S_{ti}$, $I_{ti}$ and $N_{ti}$ are the software component, instance type and number of instances selected respectively, for tier t and row i. F captures the total value and f captures the specific component value of either cost or energy consumption functions. In the case of cost($I_{ti}$) the value is retrieved from AWS published price list. In the case of energy($I_{ti}$) the values are proportionality configured to the size of the VM instance. In a real setting, values such as cost may be provided by the cloud provider. Arbitrary values may be assigned to each of the software components for cost($S_{ti}$) and energy($S_{ti}$). In a real setting, the cost of a software component may be retrieved from the vendor, and the energy consumption may be determined empirically.

Capacity (i.e. disk space) and performance (transactions per minute) may be determined by the weakest tier:

$$Capacity_i = \min\{Capacity(I_{ti}) * N_{ti}\} \quad \text{Eq 10}$$

for number of tiers, t, ranges from 1 to 3.

$$Transactions_i = \min\{Transactions(S_{ti}) * Scaling(I_{ti}) * N_{ti}\} \quad \text{Eq 11}$$

for number of tiers, t, ranges from 1 to 3 where, capacity($I_{ti}$) represents the disk capacity of instance type $I_{ti}$ and is arbitrarily set proportionally to the instance type size, transactions($S_{ti}$) is the number assigned to the software transaction throughput, scaling($I_{ti}$) is a function that represents the compute power (number of vCPUs and memory) of $I_{ti}$ relative to a provide basic VM unit.

In the example, the availability attribute may be determined based on assumption that all tiers are connected as serial components, and within each tier the components run in parallel, hence, according to simple availability model, availability of tier t:

$$A_{ti} = 1 - [1 - availability(I_{ti})]^{N_{ti}} \quad \text{Eq 12}$$

where, availability($I_{ti}$) may be arbitrary proportional values assuming that a large VM requires longer instantiation period than a smaller one. Accurate values may be provided by the cloud providers upon configuration. As such, the application availability in row i may be computed as:

$$A_i = \Pi_t A_{ti} \quad \text{Eq 13}$$

Once the quality attributes values are estimated, the application may receive its score based on customer's priorities. The calculator enables to configure and compare up to three quality attributes (NFR) lists.

To compute the weighted score for each alternative given a prioritized list of n NFRs, the following may be defined. A labeled value set $L=[V_0 \ldots V_{n-1}]$ is organized such that $V_0$ is the value of highest priority NFR and $V_{n-1}$ is the value of the lowest priority one. The associated weighted score for row i ($WS_i$) is equivalent to the pair-wise comparison method described in previous section, and the overall score per a given prioritized NFR list is computed as:

Let S be the sum of all integers up to n, i.e., $$S=(n*(n+1))/2$$

$$WS_i=0$$

for k=0 to n−1:

$$weight=(n-k)/S$$

$$WS_i=WS_i+weight*V_k$$

The calculator may compute, for each application configuration, the actual A-CED and wasted W-CED carbon emissions debts. The calculator may use priority lists that match the three types of enterprise approach to carbon efficiency described in previous section: a Green enterprise that prioritize sustainability over all other NFRs; a Gray enterprise that prioritize overall cost of the solution; and a Blue enterprise that prioritize performance indicated by transaction per minute capacity.

FIG. 6B illustrates an example table 700 of profile scores of candidate application deployments. The table shows partial results of weighted scores and carbon debts calculations from the above.

Initially, each application software components selection is assigned with three possible deployment configurations: (1) a lean configuration that meets the lower range boundaries of relevant NFRs; (2) a medium size compute configuration and a scaled configuration. This initial setting is examined alongside the quality prioritization lists of green, gray, and blue assisting the user to focus on the most contributing element for driving the requirements relaxation process. As an example, configuration A+D+F:2, in an initial configuration yields high scores both for gray and blue enterprises, yet produced a relative high wasted carbon emission debt, W-CED, of above 40 Watts/hour.

Figure 7:
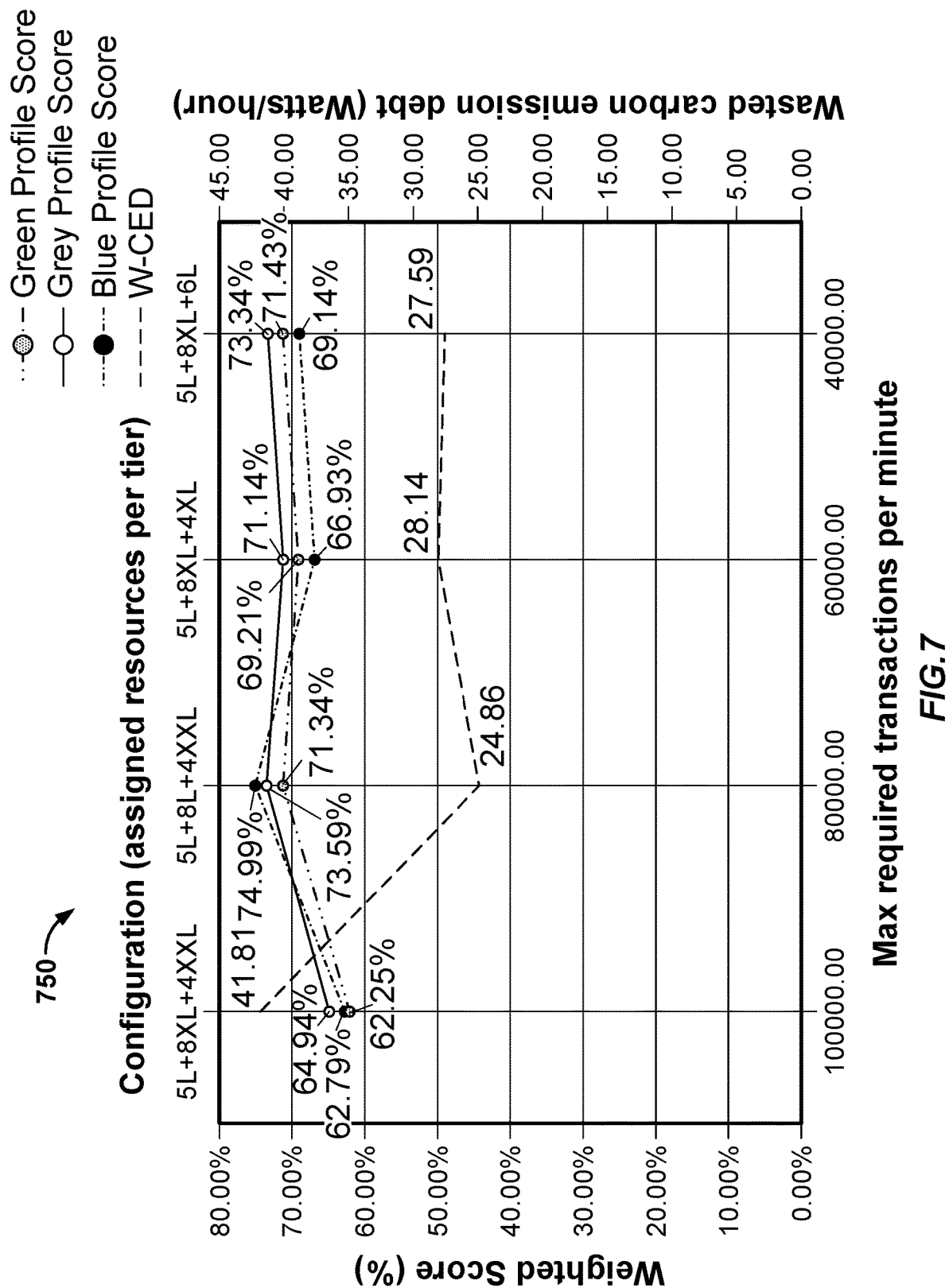
FIG. 7 illustrates an example graph of results of various configurations.

FIG. 7 illustrates an example graph 750 of results of various configurations. The graphs shows results of the relaxation process for configuration A+D+F:2. The VMs allocated to each tier are marked as #T, where # is the number of instances and T represents type of instance (L for a1.large, XL for a1.xlarge, XXL for a1.x2large, and so on). As shown in FIG. 7, it is possible to find a deployment and compute configuration that reduces the W-CED, and in addition improves the weighted quality scores of the alternative. As the relaxation process is implemented, the system starts with the maximum number of transactions per minute and decreases it by 20K per iteration. As expected, it leads to improved scores for a blue profile of a transaction-oriented enterprise since it favors the transaction quality attribute. As shown in FIG. 7, relaxing transactions to 80K and using smaller VMs for the middle tier, leads to improved overall quality scores and a much better W-CED of about 25 Watts/hour. In this example, further relaxation both reduces the overall weighted quality scores yet increases the W-CED.

As can be seen from this scenario, carbon efficiency can be achieved without a high penalty on other quality parameters. The calculator may be configured to yield such predictions and empirical examination. Analysis may be automated by linking to a knowledge graph that captures interdependencies between software components and NFR, and coupled with automated analysis to find optimal configuration even for complex scenarios.

A most impactful quality attribute may be searched for in order to adjust its score temporarily to the maximum value possible, artificially nullifying its proportional contribution. As such, the same algorithm can serve as an estimate for a theoretical solution with the minimal carbon debt, and hence propose which requirements should be relaxed next.

Accordingly, an approach for estimating a level of carbon emission debt for a software solution in a cloud environment may be based on comparing weighted quality scores of deployment solution architectures. The minimal theoretical emission level may be based on a feasible solution in which the carbon emission levels are fully controlled by native cloud services of the cloud provider. The upper boundary may depend on an elected solution architecture that has the highest overall quality score considering multiple quality attributes criteria, without considering carbon efficiency needs. The lower range may be the theoretical optimum that serves as a possible direction for potential reduction in carbon footprint by changing some of the solution components configurations, infrastructure configuration, or relaxing the requirements on other quality attributes.

The calculator may use fixed and small number of permutations in order to define the interstice problem to address. A real complex solution may include multiple components, cloud services and native applications, and hence may be a form of graph topological structure with multiple aspects of requirements quality and automated evaluation. Such an automated solution can enable forecasting of economics viability in cloud migration and configuration, as well as constant optimization of existing solutions as new native cloud services emerge.

In some examples, new services on the cloud may replace older ones or provide variations, such as a new database. In some examples, a new service such as a notification system may be implemented. In some examples, internally implemented components that were part of a selected architecture software solution may be replaced by a remote application interface. The value of the service, such as the notification service, can be archived by calling and passing data to a native cloud API. In cases like this, the disclosed systems might not be able to evaluate the actual carbon offset needs of the service, as there is no visibility into the method of implementing that service, nor ability to change that service. As such, the ability of the system to change and compute the actual carbon offset under control may be limited to the constructed components. The replacement of the implementation of such a notification service that is remotely accessed changes the computation proposal, and hence the optimization procedure can therefore be reactivated to reevaluate the proposal for the architecture structure.

Figure 8:
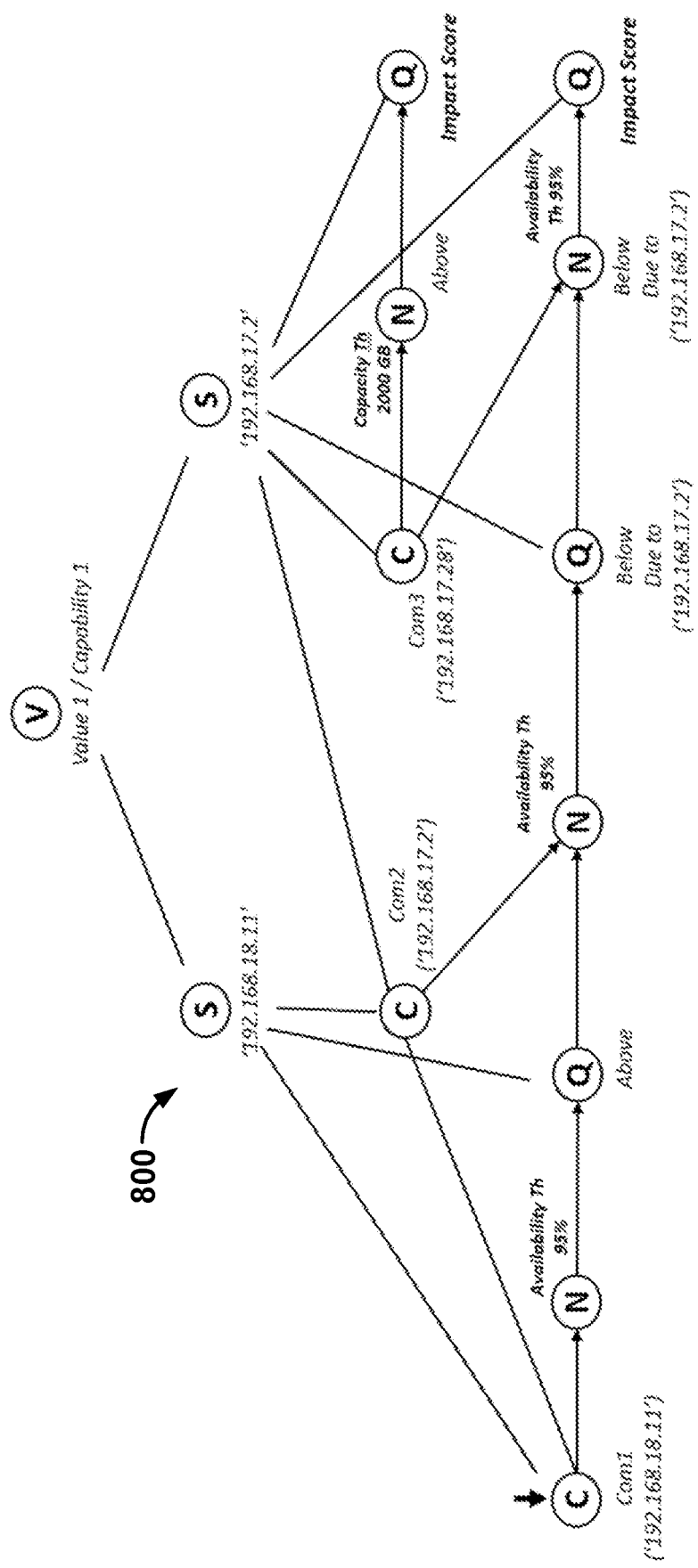
FIG. 8 illustrates an example graph of interdependencies between components of cloud architectures.

FIG. 8 illustrates an example graph 800 of interdependencies between components of cloud architectures. As the carbon calculator considers a given software architecture configuration which depicts structural and functional dependency, all components of the architecture participate in the execution of the software. The more capabilities the software is required to deliver, the more components exist, and more interdependencies exist. The result is a complex mesh or graph, e.g., the graph 800, that depicts relations between components and direction of activation or dependency. Thus, the result of a NFR for the entire system can be evaluated as an aggregated impact of a certain NFR actual value. The NFR value for an internal element within the grid has an impact that propagates through other components to the highest level of the architecture. For example, by adding, averaging, and/or selecting the highest value of a certain quality attributes along the path of the architecture graph blueprint (the composition and dependency of the graph), a new aggregated NFR value is generated. As such, every NFR attribute can be calculated across a given permutation of software architecture configuration option, and can be cross-related to the carbon offset.

In some examples, the graph 800 can function as a digital twin of software API and native services that can be used to analyzing structural implications by considering associations between application associations. The graph 800 is an organized representation of available software components that can be used to determine aggregated impacts on sustainability. Using the graph, a logical solution for cloud deployment architectures can be determined, including selecting combinations of software, operating systems, and/or native cloud services.

The graph 800 can be defined by graph data. The graph data can define nodes of the graph and edges connecting between the nodes. In some examples, the nodes include a first set of nodes representing software components and a second set of nodes representing potential deployment targets for the software components. For example, nodes labeled "C" in the graph 800 represent software components, and nodes labeled "S" represent potential deployment targets.

Each candidate cloud deployment architecture includes at least one software node and at least one deployment target node. Each edge can represent an interdependency between nodes. For example, lines of the graph 800 can be considered edges that represent interdependencies between software components and deployment targets.

In some examples, selecting a deployment architecture can include determining, for each candidate cloud deployment architecture and based on the graph data, a value of each quality attribute. For example, the score evaluator 136 can evaluate quality attributes of the candidate architectures 145 based on the graph data to determine respective quality scores.

In some examples, the score evaluator 136 can determine the quality scores by determining, for each node of the candidate cloud deployment architecture, a value of the quality attribute based on the interdependencies represented by edges connected to the node. The score evaluator 136 can aggregate the values of the quality attributes for the nodes of the candidate cloud deployment architecture. The score evaluator 136 can determine the quality scores for the candidate architectures 145 based on determining whether the value of each quality attribute satisfies the corresponding requirement, e.g., the weighted attribute requirements 135.

Figure 9:
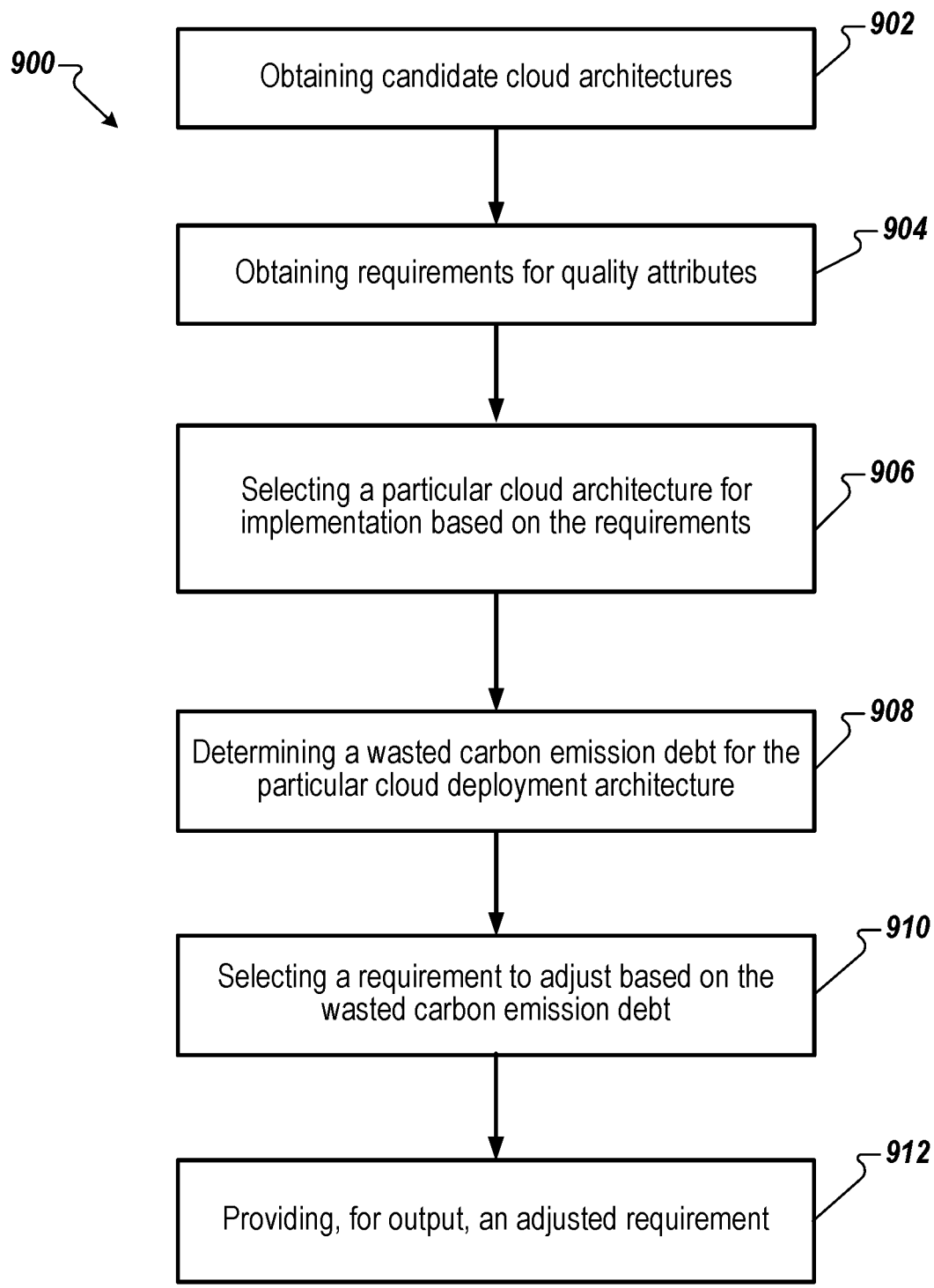
FIG. 9 is a flow chart of an example process for estimating and improving residual carbon debt in cloud-based applications.

FIG. 9 is a flow chart of an example process 900 for estimating and improving residual carbon debt in cloud-based applications. The process 900 can be performed by one or more computing systems, e.g., by the server system 105.

The process 900 obtaining candidate cloud deployment architectures (902). Each candidate cloud deployment architecture can include a set of software components and a respective deployment target for each software component. Each deployment target can include a VM, a physical machine, or a container. For example, the architecture designer 134 can generate candidate architectures 145 based on available hardware 111 and available software 113.

The process 900 includes obtaining requirements for quality attributes (904). For example, the requirements module can receive data indicating a set of attributes 114 and criteria 116 associated with the attributes 114. The criteria 116 can include requirements corresponding to respective attributes 114 of the candidate architectures 145.

The quality attributes can include, for example, energy consumption, capacity, transaction rate, cost rate, and availability of the candidate cloud deployment architectures. In some examples, each requirement includes a range of values for the corresponding quality attribute. In an example, for a quality attribute of power consumption, a corresponding requirement may include a range of two watts per hour or less. In another example, for a quality attribute of availability, a corresponding requirement may include a range of ninety-nine percent or greater.

The process 900 includes selecting a particular cloud deployment architecture for implementation based on the requirements (906). For example, the architecture selector 138 can select, from the candidate architectures 145, the selected architecture 148 for implementation based on the set of requirements for the quality attributes. In some examples, the selected architecture 148 includes a set of software components and a respective deployment target for each software component of the set of software components.

Selecting a particular cloud deployment architecture for implementation based on the set of requirements for the quality attributes can include determining a quality score for each of the candidate cloud deployment architectures. For example, the score evaluator 136 can determine a candidate architecture score 146 for each of the candidate architectures 145 based on the weighted attribute requirements 135. The architecture selector 138 can then select the selected architecture 148 based on the quality scores.

Determining the quality score for a candidate cloud deployment architecture can include, for each of the quality attributes: determining an optimal value for the quality attribute; and determining a quality attribute score by normalizing a value of the quality attribute for the candidate cloud deployment architecture relative to the optimal value for the quality attribute. For example, for a quality attribute of capacity, an optimal value may be 1000 GB and a minimum value may be 100 GB. A value of the capacity for the candidate cloud deployment architecture may be 700 GB. The value of the capacity for the candidate cloud deployment architecture can be normalized by Equation 1 to obtain a quality score of 0.67 for the capacity of the candidate cloud deployment architecture.

Determining the quality score for a candidate cloud deployment architecture can include determining a respective weight of importance of each quality attribute, weighting the quality attribute scores for each of the quality attributes based on the respective weight of importance, and summing the weighted quality attribute scores for the candidate cloud deployment architecture. For example, the score evaluator 136 may determine a quality score of 0.67 for capacity, of 0.88 for transaction rate, and of 0.50 for cost. The score evaluator 136 can weight each quality score by a respective weight of importance and sum the resulting weighted scores by Equation 5.

The process 900 includes determining a wasted carbon emission debt for the particular cloud deployment architecture (908). For example, the power consumption evaluator 142 can determine a wasted carbon emission debt for the selected architecture 148. Determining the wasted carbon emission debt can include determining a theoretical carbon emission debt for the candidate cloud deployment architecture having the minimal aggregated carbon emission footprint, and determining an actual carbon emission debt for the selected architecture 148. The wasted carbon emission debt can be determined based on a difference between the actual carbon emission debt of the selected architecture 148 and the theoretical carbon emission debt.

Determining the theoretical carbon emission debt for the candidate cloud deployment architecture can include determining, for each candidate cloud deployment architecture, a value of the quality attribute of carbon emission, and selecting the candidate cloud deployment architecture having the lowest value of carbon emission. The theoretical carbon emission debt can then be defined as the lowest value for carbon emission. For example, the candidate architecture 145 having the lowest value of carbon emission compared to all other candidate architectures 145 may have a value of 63.70 watts per hour (W/hr). The theoretical carbon emission debt can thus be defined as 63.70 W/hr.

The process 900 includes selecting a requirement to adjust based on the wasted carbon emission debt (910). For example, the power consumption evaluator 142 can select a requirement corresponding to a particular quality attribute to adjust based on the wasted carbon emission debt of the selected architecture 148.

Selecting the requirement to adjust can include determining a quality attribute having a highest impact on carbon emission debt, determining a proposed adjusted requirement corresponding to the quality attribute, and determining an expected change in carbon emission debt for the proposed adjusted requirement for the selected architecture 148. Based on determining that the expected change in the carbon emission debt exceeds a specified threshold change, the power consumption evaluator 142 can select to adjust the requirement for the quality attribute to the proposed adjusted requirement. In an example, the power consumption evaluator 142 may determine that the quality attribute of availability has the highest impact on carbon emission debt compared to other quality attributes. The power consumption evaluator 142 can determine a proposed adjusted requirement by proposing to adjust the availability requirement from a minimum of ninety-nine percent to a minimum of ninety-seven percent. The power consumption evaluator 142 can determine that an expected change in carbon emission debt for the proposed adjustment to the availability requirement is a reduction of 10 W/hr from 35 W/hr to 25 W/hr. A threshold change in carbon emission debt may be 5 W/hr. The power consumption evaluator 142 can determine that the reduction of 10 W/hr is greater than the threshold change of 5 W/hr, and therefore can determine to adjust the availability requirement to the adjusted requirement of ninety-seven percent.

Selecting the requirement to adjust can include selecting a quality attribute, determining a proposed adjusted requirement corresponding to the quality attribute and determining a quality score for the particular cloud deployment architecture with the proposed adjusted requirement applied to the selected quality attribute, and determining that the particular cloud deployment architecture with the proposed adjusted requirement applied to the selected quality attribute reduces the wasted carbon emission debt of the particular cloud deployment architecture. Based on determining that the quality score for the particular cloud deployment architecture exceeds a specified threshold quality score, the power consumption evaluator 142 can select to adjust the requirement for the quality attribute to the proposed adjusted requirement.

In an example, the power consumption evaluator 142 may select a quality attribute of cost. The power consumption evaluator 142 can determine a proposed adjusted requirement by proposing to adjust the cost requirement from a maximum of $5 per hour to a maximum of $7 per hour. The power consumption evaluator 142 can determine that an expected change in carbon emission debt for the proposed adjustment to the cost requirement is a reduction of 15 W/hr from 37 W/hr to 22 W/hr. The score evaluator 136 can determine a quality score for the cloud deployment architecture of 0.88 with the proposed adjusted requirement applied. The power consumption evaluator 142 can determine that the quality score of 0.88 exceeds a threshold quality score of 0.80, and therefore can determine to adjust the cost requirement to the adjusted requirement of $7 per hour.

The process 900 can include providing, for output, an adjusted requirement (912). For example, the power consumption evaluator 142 can output an adjusted requirement 150 corresponding to the particular quality attribute to the requirements module 132. The requirements module 132 can then determine updated weighted attribute requirements 135 based on the adjusted requirement 150.

In some examples, providing the adjusted requirement includes relaxing the requirement. For example, relaxing a requirement for a quality attribute of cost can include increasing a maximum cost per hour. Relaxing a requirement for a quality attribute of availability can include decreasing a minimum availability percentage. Relaxing a requirement for a quality attribute of energy consumption can include increasing a maximum energy consumption rate. Relaxing a requirement for a quality attribute of capacity can include reducing a minimum memory capacity.

In some examples, the process 900 can include deploying the particular cloud deployment architecture by instantiating each software component of the first set of software components on the respective deployment targets. For example, the deployment engine 140 can deploy the selected architecture 148 by initiating an architecture deployment 155 within the enterprise network 120.

Figure 10:
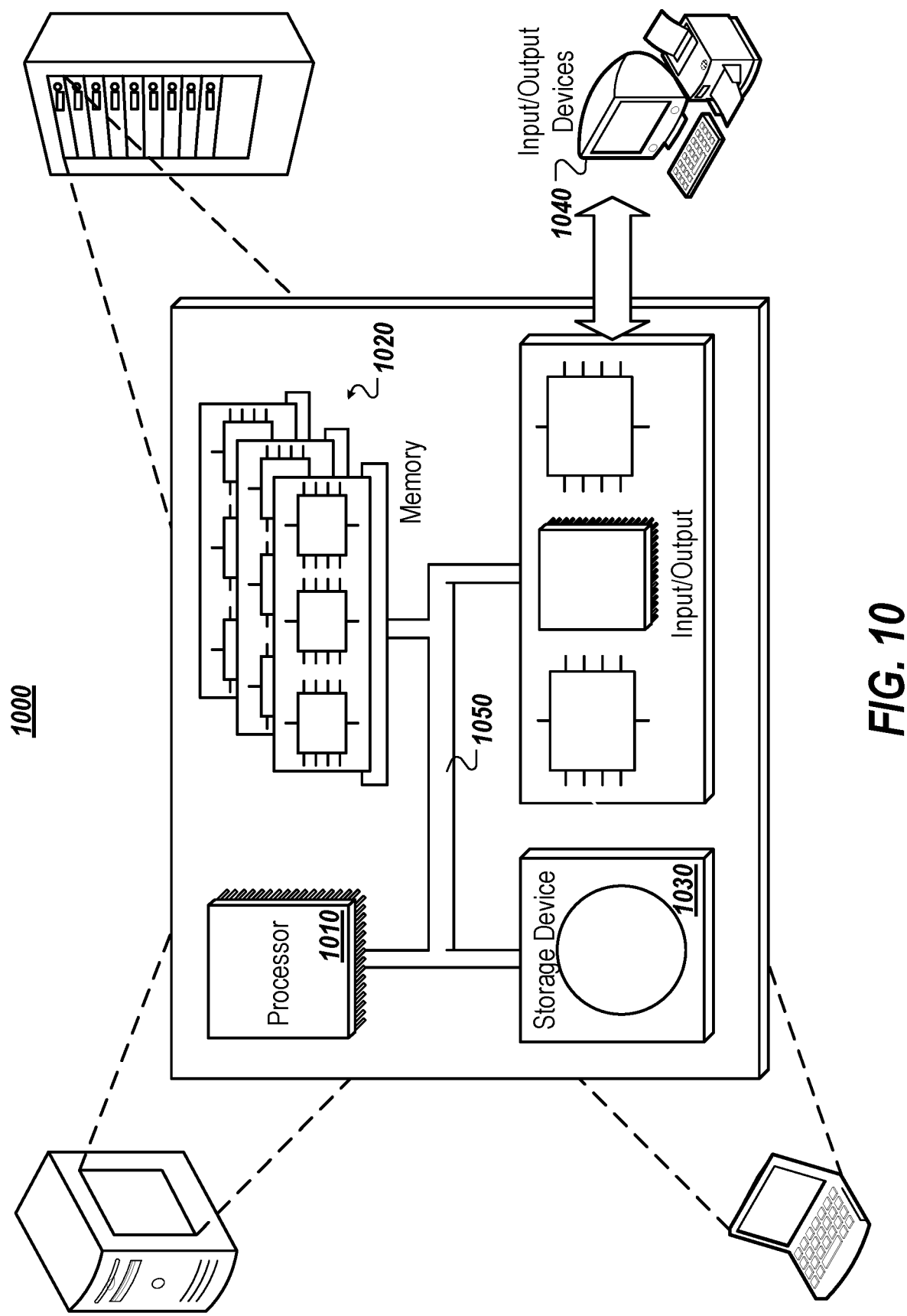
FIG. 10 illustrates a schematic diagram of an exemplary generic computer system.

FIG. 10 illustrates a schematic diagram of an exemplary generic computer system 1000. The carbon neutrality calculator described above may be implemented on the system 1000.

The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 may be a floppy disk device, a hard disk device, a solid state drive, an optical disk device, a tape device, universal serial bus stick, or some other storage device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment. A computer program can include one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a rail trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. The servers may be part of a cloud, which may include ephemeral aspects.

While this specification contains many specific implementation details, these should not be construed as limitations on the scope of any system or on the scope of what may be claimed, but rather as descriptions of features that may be specific to particular implementations of particular systems. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of sub-combinations.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
    obtaining candidate cloud deployment architectures;
    obtaining a set of requirements for quality attributes, each requirement corresponding to a respective quality attribute of the candidate cloud deployment architectures;
    selecting, from the candidate cloud deployment architectures, a particular cloud deployment architecture for implementation based on the set of requirements for the quality attributes:
        wherein the particular cloud deployment architecture comprises a first set of software components and a respective deployment target for each software component of the first set of software components,
        wherein selecting the particular cloud deployment architecture comprises:
            determining a quality score for each of the candidate cloud deployment architectures, wherein determining the quality score for the candidate cloud deployment architecture comprises:
                for each of the quality attributes:
                    determining, based on the corresponding requirement, an optimal value for the quality attribute; and
                    determining a quality attribute score by normalizing a value of the quality attribute for the candidate cloud deployment architecture relative to the optimal value for the quality attribute; and
            selecting the particular cloud deployment architecture based on the quality score;
    deploying the particular cloud deployment architecture by instantiating each software component of the first set of software components on the respective deployment targets;
    determining a wasted carbon emission debt for the particular cloud deployment architecture;
    selecting a requirement corresponding to a particular quality attribute to adjust based on the wasted carbon emission debt; and
    providing, for output, an adjusted requirement corresponding to the particular quality attribute.

2. The method of claim 1, wherein determining the wasted carbon emission debt comprises:
    determining a theoretical carbon emission debt for the candidate cloud deployment architecture having the minimal carbon emission footprint; and
    determining an actual carbon emission debt for the particular cloud deployment architecture,
    wherein the wasted carbon emission debt comprises a difference between the actual carbon emission debt and the theoretical carbon emission debt.

3. The method of claim 2, wherein determining the theoretical carbon emission debt for the candidate cloud deployment architecture having the minimal carbon emission footprint comprises:
    determining, for each candidate cloud deployment architecture, a respective value for a first quality attribute of carbon emission;

selecting the candidate cloud deployment architecture having the lowest respective value for the first quality attribute; and defining the theoretical carbon emission debt as the lowest respective value for the first quality attribute.

4. The method of claim 1, where selecting the requirement corresponding to a particular quality attribute to adjust based on the wasted carbon emission debt comprises:
determining a quality attribute having a highest impact on carbon emission debt;
determining a proposed adjusted requirement corresponding to the quality attribute;
determining an expected change in carbon emission debt for the proposed adjusted requirement for the particular cloud deployment architecture; and
based on determining that the expected change in the carbon emission debt exceeds a specified threshold change, selecting to adjust the requirement for the quality attribute to the proposed adjusted requirement.

5. The method of claim 1, where selecting the requirement corresponding to a particular quality attribute to adjust based on the wasted carbon emission debt comprises:
selecting a quality attribute;
determining a proposed adjusted requirement corresponding to the quality attribute,
determining a quality score for the particular cloud deployment architecture with the proposed adjusted requirement applied to the selected quality attribute;
determining that the particular cloud deployment architecture with the proposed adjusted requirement applied to the selected quality attribute reduces the wasted carbon emission debt of the particular cloud deployment architecture; and
based on determining that the quality score for the particular cloud deployment architecture exceeds a specified threshold quality score, selecting to adjust the requirement for the quality attribute to the proposed adjusted requirement.

6. The method of claim 1, wherein determining the quality score for a candidate cloud deployment architecture comprises:
determining a respective weight of importance of each quality attribute;
weighting the quality attribute scores for each of the quality attributes based on the respective weight of importance; and
summing the weighted quality attribute scores for the candidate cloud deployment architecture.

7. The method of claim 1, comprising:
providing graph data defining a graph including nodes and edges connecting between the nodes, wherein:
the nodes include a first set of nodes representing software components and a second set of nodes representing potential deployment targets for the software components;
each candidate cloud deployment architecture includes at least one node of the first set of nodes and at least one node of the second set of nodes; and
each edge represents an interdependency between nodes;
determining, for each candidate cloud deployment architecture and based on the graph data, a value of each quality attribute; and
determining a quality score for each candidate cloud deployment architecture based on the value of each quality attribute for the candidate cloud deployment architecture.

8. The method of claim 7, wherein determining a value of a quality attribute for a candidate cloud deployment architecture based on the graph data comprises:
determining, for each node of the candidate cloud deployment architecture, a value of the quality attribute based on the interdependencies represented by edges connected to the node; and
aggregating the values of the quality attributes for the nodes of the candidate cloud deployment architecture.

9. The method of claim 7, wherein determining a quality score for a candidate cloud deployment architecture based on the value of each quality attribute comprises determining whether the value of each quality attribute satisfies the corresponding requirement.

10. The method of claim 1, wherein each requirement of the set of requirements includes a range of values for the corresponding quality attribute.

11. The method of claim 1, wherein providing the adjusted requirement comprises relaxing the requirement.

12. The method of claim 1, wherein each candidate cloud deployment architecture comprises a set of software components and a respective deployment target for each software component.

13. The method of claim 12, wherein each deployment target comprises a virtual machine, a physical machine, or a container.

14. The method of claim 1, wherein the quality attributes comprise one or more of energy consumption, capacity, transaction rate, cost rate, and availability of the candidate cloud deployment architectures.

15. One or more non-transitory computer-readable storage media coupled to one or more processors and having instructions stored thereon which, when executed by the one or more processors, cause the one or more processors to perform operations comprising:
obtaining candidate cloud deployment architectures;
obtaining a set of requirements for quality attributes, each requirement corresponding to a respective quality attribute of the candidate cloud deployment architectures;
selecting, from the candidate cloud deployment architectures, a particular cloud deployment architecture for implementation based on the set of requirements for the quality attributes,
wherein the particular cloud deployment architecture comprises a first set of software components and a respective deployment target for each software component of the first set of software components,
wherein selecting the particular cloud deployment architecture comprises:
determining a quality score for each of the candidate cloud deployment architectures, wherein determining the quality score for the candidate cloud deployment architecture comprises:
for each of the quality attributes:
determining, based on the corresponding requirement, an optimal value for the quality attribute; and
determining a quality attribute score by normalizing a value of the quality attribute for the candidate cloud deployment architecture relative to the optimal value for the quality attribute; and
selecting the particular cloud deployment architecture based on the quality score;

deploying the particular cloud deployment architecture by instantiating each software component of the first set of software components on the respective deployment targets:

determining a wasted carbon emission debt for the particular cloud deployment architecture;

selecting a requirement corresponding to a particular quality attribute to adjust based on the wasted carbon emission debt; and providing, for output, an adjusted requirement corresponding to the particular quality attribute.

16. A system, comprising: one or more processors; and a computer-readable storage device coupled to the one or more processors and having instructions stored thereon which, when executed by the one or more processors, cause the one or more processors to perform operations comprising:

obtaining candidate cloud deployment architectures;

obtaining a set of requirements for quality attributes, each requirement corresponding to a respective quality attribute of the candidate cloud deployment architectures;

selecting, from the candidate cloud deployment architectures, a particular cloud deployment architecture for implementation based on the set of requirements for the quality attributes, wherein the particular cloud deployment architecture comprises a first set of software components and a respective deployment target for each software component of the first set of software components, wherein selecting the particular cloud deployment architecture comprises:

determining a quality score for each of the candidate cloud deployment architectures, wherein determining the quality score for the candidate cloud deployment architecture comprises:

for each of the quality attributes:

determining, based on the corresponding requirement, an optimal value for the quality attribute; and determining a quality attribute score by normalizing a value of the quality attribute for the candidate cloud deployment architecture relative to the optimal value for the quality attribute; and selecting the particular cloud deployment architecture based on the quality score;

deploying the particular cloud deployment architecture by instantiating each software component of the first set of software components on the respective deployment targets;

determining a wasted carbon emission debt for the particular cloud deployment architecture;

selecting a requirement corresponding to a particular quality attribute to adjust based on the wasted carbon emission debt; and providing, for output, an adjusted requirement corresponding to the particular quality attribute.

* * * * *